United States Patent
Sims, III et al.

(10) Patent No.: US 8,051,031 B2
(45) Date of Patent: Nov. 1, 2011

(54) METADATA FOR SOFTWARE AIRCRAFT PARTS

(75) Inventors: John Benjamin Sims, III, Littleton, CO (US); Hai Nguyen, Aurora, CO (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 12/026,918

(22) Filed: Feb. 6, 2008

(65) Prior Publication Data

US 2009/0198712 A1 Aug. 6, 2009

(51) Int. Cl.
*G06F 7/00* (2006.01)
*G06F 17/30* (2006.01)

(52) U.S. Cl. .......................................... 707/602
(58) Field of Classification Search .......... None
See application file for complete search history.

(56) References Cited

U.S. PATENT DOCUMENTS

| | | | |
|---|---|---|---|
| 3,745,575 A | 7/1973 | Kikuchi | |
| 5,668,342 A | 9/1997 | Discher | |
| 5,900,833 A | 5/1999 | Sunlin et al. | |
| 6,057,765 A | 5/2000 | Jones et al. | |
| 6,094,157 A | 7/2000 | Cowdrick | |
| 6,163,259 A | 12/2000 | Barsumian et al. | |
| 6,501,414 B2 | 12/2002 | Arndt et al. | |
| 6,522,285 B2 | 2/2003 | Stolarczyk et al. | |
| 6,864,825 B2 | 3/2005 | Holly | |
| 6,897,777 B2 | 5/2005 | Holmes et al. | |
| 6,943,742 B2 | 9/2005 | Holly | |
| 6,950,076 B2 | 9/2005 | Holly | |
| 6,999,041 B2 | 2/2006 | Holly | |
| 7,009,575 B2 | 3/2006 | Holly et al. | |
| 7,130,624 B1 | 10/2006 | Jackson et al. | |
| 7,142,147 B2 | 11/2006 | Holly | |
| 7,190,302 B2 | 3/2007 | Biggs et al. | |
| 7,473,898 B2 | 1/2009 | Holly et al. | |
| 7,528,762 B2 | 5/2009 | Cerwin | |
| 2002/0011947 A1 | 1/2002 | Stolarczyk et al. | |
| 2002/0111720 A1 | 8/2002 | Holst et al. | |
| 2002/0175849 A1 | 11/2002 | Arndt et al. | |
| 2003/0028899 A1 | 2/2003 | MacInnis | |

(Continued)

FOREIGN PATENT DOCUMENTS

| | | |
|---|---|---|
| WO | 0077614 A | 12/2000 |
| WO | 2006110991 A | 10/2006 |

OTHER PUBLICATIONS

Bradda, "Metadata Support for Safe Component Upgrades", Proceedings of Compsac'02, the 26th Annual International Computer Software & Applications Conference, Oxford, England, IEEE CS Press, Aug. 2002.*

(Continued)

*Primary Examiner* — Michael Hicks
(74) *Attorney, Agent, or Firm* — Yee & Associates, P.C.

(57) ABSTRACT

A computer implemented method, apparatus, and computer usable program code for creating a data structure residing on a computer recordable medium for verifying whether a software aircraft part can be loaded. The data structure comprises a set of aircraft identification objects. An aircraft identification object within the set of aircraft identification objects contains a level of specificity about a set of aircraft on which the software aircraft part can be loaded. The set of aircraft identification objects are capable of being read from the computer recordable medium to verify whether the software aircraft part can be loaded in an aircraft.

17 Claims, 10 Drawing Sheets

U.S. PATENT DOCUMENTS

| | | | |
|---|---|---|---|
| 2003/0041236 | A1 | 2/2003 | Nestoryak |
| 2005/0064922 | A1 | 3/2005 | Owens et al. |
| 2005/0200550 | A1 | 9/2005 | Vetrovec et al. |
| 2006/0082488 | A1 | 4/2006 | Keller |
| 2006/0206587 | A1 | 9/2006 | Fabbrocino |
| 2007/0013577 | A1 | 1/2007 | Schnitzer et al. |
| 2007/0024489 | A1 | 2/2007 | Cerwin |
| 2007/0046791 | A1 | 3/2007 | Wang et al. |
| 2008/0092518 | A1 | 4/2008 | Winkler et al. |
| 2008/0127171 | A1 | 5/2008 | Tarassov |
| 2008/0127175 | A1 | 5/2008 | Naranjo et al. |
| 2008/0295090 | A1 | 11/2008 | Bestle et al. |
| 2009/0040093 | A1 | 2/2009 | Holly et al. |
| 2009/0198393 | A1 | 8/2009 | Sims, III et al. |

OTHER PUBLICATIONS

Thomas, "Common Airborne Instrumentation System; A Fresh Look", Accession No. ADA392006, Naval Air Warfare Center Aircraft Div Patuxent River MD, Jul. 2001).*

U.S. Appl. No. 12/026,926, filed Feb. 6, 2008, Sims, III et al.
U.S. Appl. No. 11/758,787, filed Jun. 6, 2007, Holly et al.
U.S. Appl. No. 12/167,753, filed Mar. 7, 2008, Holly et al.
Wilson et al., "Improvised Explosive Devices (IEDs) in Iraq and Afghanistan: Effects and Countermeasures", CRS Report for Congress, updated Nov. 21, 2007, pp. 1-6.
U.S. Appl. No. 11/393,386, filed Mar. 30, 2006, Schultz et al.
U.S. Appl. No. 12/412,919, filed Mar. 27, 2009, Holly et al.
U.S. Appl. No. 12/504,293, filed Jul. 16, 2009, Holly et al.
U.S. Appl. No. 12/412,919, filed Mar. 27, 2009, Holly et al.
U.S. Appl. No. 12/481,941, filed Jun. 10, 2009, Burns et al.
U.S. Appl. No. 11/758,785, filed Jun. 6, 2007, Holly et al.
U.S. Appl. No. 11/758,787, filed Jun. 6, 2007, Holly et al.
Brada, "Metadata Support for Safe Component Upgrades", Proc. of Compsac '02, 26th Annual Intl Computer Software & Applications Conf., Oxford England, IEEE Aug. 2002.
USPTO office action for U.S. Appl. No. 12/026,926 dated Mar. 14, 2011.

* cited by examiner

```
<schema xmlns="http://www.w3.org/2001/XMLSchema"
  targetNamespace="http://www.example.org/PatentMetadata"
  xmlns:tns="http://www.example.org/PatentMetadata"
  elementFormDefault="qualified">
  <element name="Metadata" type="tns:MetadataType"> </element>
  <complexType name="MetadataType">
    <sequence>
      <element name="Target" type="tns:TargetType"> </element>
    </sequence>
  </complexType>                                                      } 501
  <complexType name="TargetType">
    <choice>
      <element name="AnyAirplane"> ⎯ 508
        <simpleType>
          <restriction base="string">
            <enumeration value="ANY"> </enumeration>
          </restriction>
        </simpleType>
      </element>                                          ⎬ 504
      <element name="Tails" type="string" maxOccurs="unbounded"
        minOccurs="1">                                    ⎬ 506
      </element>
      <element name="Platform" type="tns:PlatformType"
        maxOccurs="unbounded" minOccurs="1">
      </element>
    </choice>
  </complexType>
  <complexType name="PlatformType">                                   } 502

FIG. 5A
```

```xml
<choice>
    <element name="MajorModel" type="string"
        maxOccurs="unbounded" minOccurs="1" >
    </element>
    <element name="MajorMinorModel"
        type="tns:MajorMinorModelType" maxOccurs="unbounded"
        minOccurs="1" >
    </element>
    <element name="MajorMinorModelEngine"
        type="tns:MajorMinorModelEngineType" maxOccurs="unbounded"
        minOccurs="1" >
    </element>
</choice>
</complexType>
<complexType name="MajorMinorType" > </complexType>
<complexType name="MajorMinorModelType" >
    <sequence>
        <element name="MajorModel" type="string" maxOccurs="1"
            minOccurs="1" >
        </element>
        <element name="MinorModel" type="string"
            maxOccurs="unbounded" minOccurs="1" >
        </element>
    </sequence>
</complexType>
<complexType name="MajorMinorModelEngineType">
    <sequence>
        <element name="MajorModel" type="string" maxOccurs="1"
            minOccurs="1" >
        </element>
        <element name="MinorModel" type="string" maxOccurs="1"
            minOccurs="1" >
        </element>
        <element name="Engine" type="string" maxOccurs="unbounded"
            minOccurs="1" >
        </element>
    </sequence>
</complexType>
</schema>
```

```
<?xml version="1.0" encoding="UTF-8"?>
<tns:Metadata xmlns:tns="http://www.example.org/PatentMetadata"
xmlns:xsi="http://www.w3.org/2001/XMLSchema-instance"
xsi:schemaLocation="http://www.example.org/PatentMetadata PatentMetadata.xsd
">
  <tns:Target>
     <tns:Tails>N4387BA</tns:Tails>
  <tns:Target>
</tns:Metadata>
```
602 (schemaLocation line)
604 (Tails line)

```
<?xml version="1.0" encoding="UTF-8"?>
<tns:Metadata xmlns:tns="http://www.example.org/PatentMetadata"
xmlns:xsi="http://www.w3.org/2001/XMLSchema-instance"
xsi:schemaLocation="http://www.example.org/PatentMetadata
PatentMetadata.xsd">
   <tns:Target>
      <tns:AnyAirplane>ANY</tns:AnyAirplane>
   <tns:Target>
</tns:Metadata>
```
702

```
<?xml version="1.0" encoding="UTF-8"?>
<tns:Metadata xmlns:tns="http://www.example.org/PatentMetadata"
xmlns:xsi="http://www.w3.org/2001/XMLSchema-instance"
xsi:schemaLocation="http://www.example.org/PatentMetadata
PatentMetadata.xsd">
    <tns:Target>
       <tns:Platform>
             <tns:MajorModel>777</tns:MajorModel>
             <tns:MajorModel>767</tns:MajorModel>
             <tns:MajorModel>737</tns:MajorModel>
       </tns:Platform></tns:Target>
    </tns:Metadata>
```
802, 804

*FIG. 8*

```
<?xml version="1.0" encoding="UTF-8"?>
<tns:Metadata xmlns:tns="http://www.example.org/PatentMetadata"
xmlns:xsi="http://www.w3.org/2001/XMLSchema-instance"
xsi:schemaLocation="http://www.example.org/PatentMetadata          902
PatentMetadata.xsd">
  <tns:Target>
    <tns:Platform>
          <tns:MajorMinorModel>
                <tns:MajorModel>777</tns:MajorModel>       906
                <tns:MinorModel>200</tns:MinorModel>       908    904
                <tns:MinorModel>300</tns:MinorModel>       910
          </tns:MajorMinorModel>
    </tns:Platform></tns:Target>
      </tns:Metadata>
```

*FIG. 9*

```
<?xml version="1.0" encoding="UTF-8"?>
<tns:Metadata xmlns:tns="http://www.example.org/PatentMetadata"
xmlns:xsi="http://www.w3.org/2001/XMLSchema-instance"
xsi:schemaLocation="http://www.example.org/PatentMetadata          1002
PatentMetadata.xsd">
  <tns:Target>
    <tns:Platform>
          <tns:MajorMinorModelEngine>
                <tns:MajorModel>777</tns:MajorModel>       1004
                <tns:MinorModel>200</tns:MinorModel>       1006
                <tns:Engine>GE-90</tns:Engine>             1008
          </tns:MajorMinorModelEngine>
    </tns:Platform> </tns:Target>
</tns:Metadata>
```

*FIG. 10*

METADATA FOR SOFTWARE AIRCRAFT PARTS

CROSS REFERENCE TO RELATED APPLICATION

The present disclosure is related to the following patent application: entitled "Method and Apparatus for Loading Software Aircraft Parts", Ser. No. 12/026,926, filed even date hereof, assigned to the same assignee, and incorporated herein by reference.

BACKGROUND INFORMATION

1. Field

The present disclosure relates generally to an improved data processing system and in particular to a method and apparatus for managing software for aircraft. Still more particularly, the present disclosure relates to a computer implemented method, apparatus, and computer usable program product for managing loadable software aircraft parts.

2. Background

Modern aircraft are extremely complex. For example, an aircraft may have many types of electronic systems on board. A particular electronic system on an aircraft also may be referred to as a line replaceable unit (LRU). A line replaceable unit may take on various forms. A line replaceable unit may be, for example, without limitation, a flight management system, an autopilot, an in flight entertainment system, a communication system, a navigation system, a flight controller, a flight recorder, and a collusion of boarding system.

A line replaceable unit may use software or programming to provide the logic or control for various operations and functions. The software and other information used in a line replaceable unit are commonly treated as parts in the airline industry. For example, a software application for use in the line replaceable unit on an aircraft may be tracked separately from the line replaceable unit and referred to as a loadable software aircraft part (LSAP) or as a software aircraft part.

Software aircraft parts may be loaded into a line replaceable unit as part of the delivery of the aircraft from the manufacturer or as part of a maintenance operation. Software aircraft parts may be loaded by various techniques. For example, a computer readable media, such as a floppy disk, a flash memory drive, or a digital versatile disk (DVD) may be taken to the aircraft and loaded into the computing or avionics system for the aircraft.

Other techniques may involve transmitting the software aircraft part to the computing system through a communications link established between the computing system and the source of the software aircraft part. In yet other techniques, a portable data processing system, such as a laptop, may be carried to the aircraft to transfer the software aircraft part.

Different aircraft may require different software aircraft parts. For example, different types of aircraft may require different software aircraft parts. As another example, specific aircraft of the same type also may require different software aircraft parts. For example, a Boeing 777 may have different versions. With this example, one version of this aircraft may use General Electric engines while another version of the aircraft may use Rolls Royce engines. A software aircraft part designed for a line replaceable unit used to control parameters, such as thrust settings, for engines is different for these different versions of a Boeing 777. As can be seen, software aircraft parts may be specific for a particular aircraft even within the same type or model.

Currently, a software aircraft part is verified as being appropriate for a particular target aircraft based on a human operator checking documents about the software aircraft part to ensure that the target aircraft is an appropriate aircraft for the software aircraft part. Once the appropriate software aircraft part has been identified for a target aircraft, the software aircraft part may be placed on a media for transport to the aircraft. This type of process is cumbersome and requires careful checking of software aircraft parts to ensure that the proper software aircraft part reaches the appropriate target aircraft.

SUMMARY

The advantageous embodiments provide a computer implemented method, apparatus, and computer usable program code for creating a data structure residing on a computer recordable medium for verifying whether a software aircraft part can be loaded. The data structure comprises a set of aircraft identification objects. An aircraft identification object within the set of aircraft identification objects contains a level of specificity about a set of aircraft on which the software aircraft part can be loaded. The set of aircraft identification objects are capable of being read from the computer recordable medium to verify whether the software aircraft part can be loaded in an aircraft.

In another advantageous embodiment, a computer implemented method is present for identifying usability of a software aircraft part in an aircraft. A particular level of specificity needed to specify a set of aircraft is identified on which the software aircraft part is usable. A set of aircraft identification objects is created. The set of aircraft identification objects contains a level of specificity about the set of aircraft on which the software aircraft part can be loaded and wherein the set of aircraft identification objects are capable of being extracted by a data processing system from a computer recordable medium to verify whether the software aircraft part can be loaded onto the aircraft.

In yet another advantageous embodiment, a computer program product for verifying whether a software aircraft part can be loaded comprises a computer recordable medium and program code. Program code, stored on the computer recordable medium, is present for identifying a particular level of specificity needed to specify a set of aircraft on which the software aircraft part is usable. Program code, stored on the computer recordable medium, is present for creating a set of aircraft identification objects, wherein the set of aircraft identification objects contains a level of specificity about the set of aircraft on which the software aircraft part can be loaded and wherein the set of aircraft identification objects are capable of being extracted by a data processing system from the computer recordable medium to verify whether the software aircraft part can be loaded onto an aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIGS. 5a and 5b are a diagram illustrating a schema for metadata in accordance with an advantageous embodiment;

FIG. 6 is an example of a metadata file specifying a unique tail identifier for a target in accordance with an advantageous embodiment;

FIG. 7 is a diagram illustrating a metadata file specifying a target for any aircraft in accordance with an advantageous embodiment;

FIG. 8 is a diagram illustrating a metadata file specifying a set of major models in accordance with an advantageous embodiment;

FIG. 9 is a metadata file specifying a major model with a set of minor models in accordance with an advantageous embodiment;

FIG. 10 is a metadata file specifying a major model and a minor model with an engine type in accordance with an advantageous embodiment;

DETAILED DESCRIPTION

Figure 1:
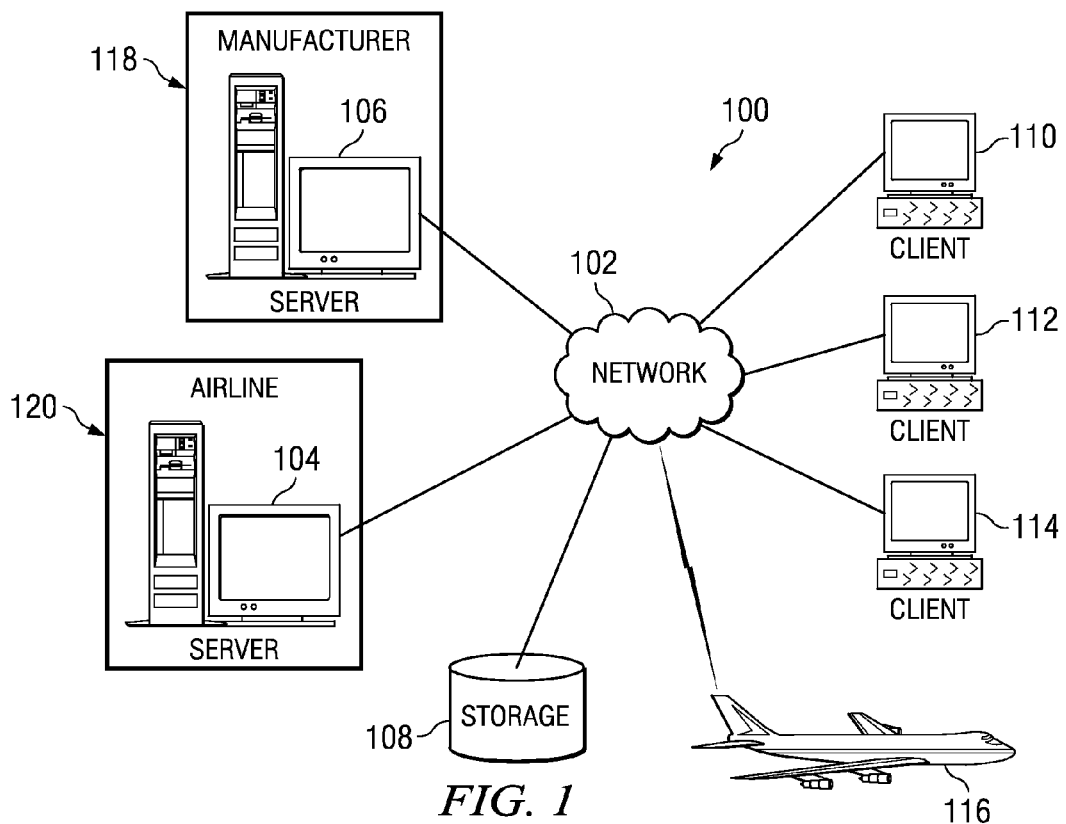
FIG. 1 is a pictorial representation of a network of data processing systems in which the advantageous embodiments may be implemented.
Figure 2:
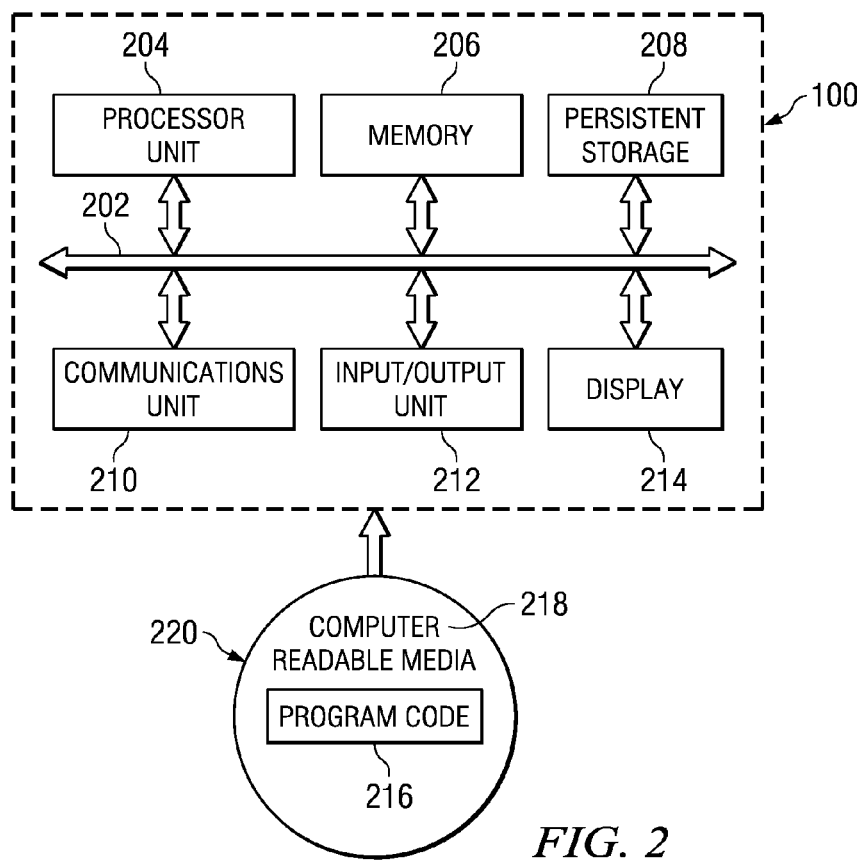
FIG. 2 is a diagram of a data processing system in accordance with an advantageous embodiment.

With reference now to the figures and in particular with reference to FIGS. 1-2, exemplary diagrams of data processing environments are provided in which the advantageous embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to FIG. 1, a pictorial representation of a network of data processing systems is depicted in which the advantageous embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. For example, aircraft 116 may receive software aircraft parts from servers 104 and/or 106. Aircraft 116 may exchange data with different computers through a wireless communications link while in-flight or any other type of communications link while on the ground. In these examples, server 104, server 106, client 110, client 112, and client 114 may be computers in different geographic locations. Network data processing system 100 may include additional servers, clients, and other devices not shown.

In these examples, server 106 may be located in manufacturer 118. Manufacturer 118 may create software aircraft parts for loading or distribution to aircraft 116 from server 106. As another example, airline 120 may store software aircraft parts on server 104. These software aircraft parts may be created by airline 120 or may be received from manufacturer 118. The software aircraft parts stored on server 104 may be distributed or transmitted to an aircraft, such as aircraft 116. The distribution of the software aircraft parts may occur through the transmission of these software aircraft parts through network 102. In other advantageous embodiments, software aircraft parts may be transferred through the use of portable devices, such as data loaders, or the use of media, such as a digital versatile disk or a flash memory drive.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an advantageous embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded into or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize that currently existing systems for loading software aircraft parts onto a computing system for an aircraft require many tedious checks to ensure that errors do not occur when a software aircraft part is selected for loading onto a computing system of an aircraft.

Figure 3:
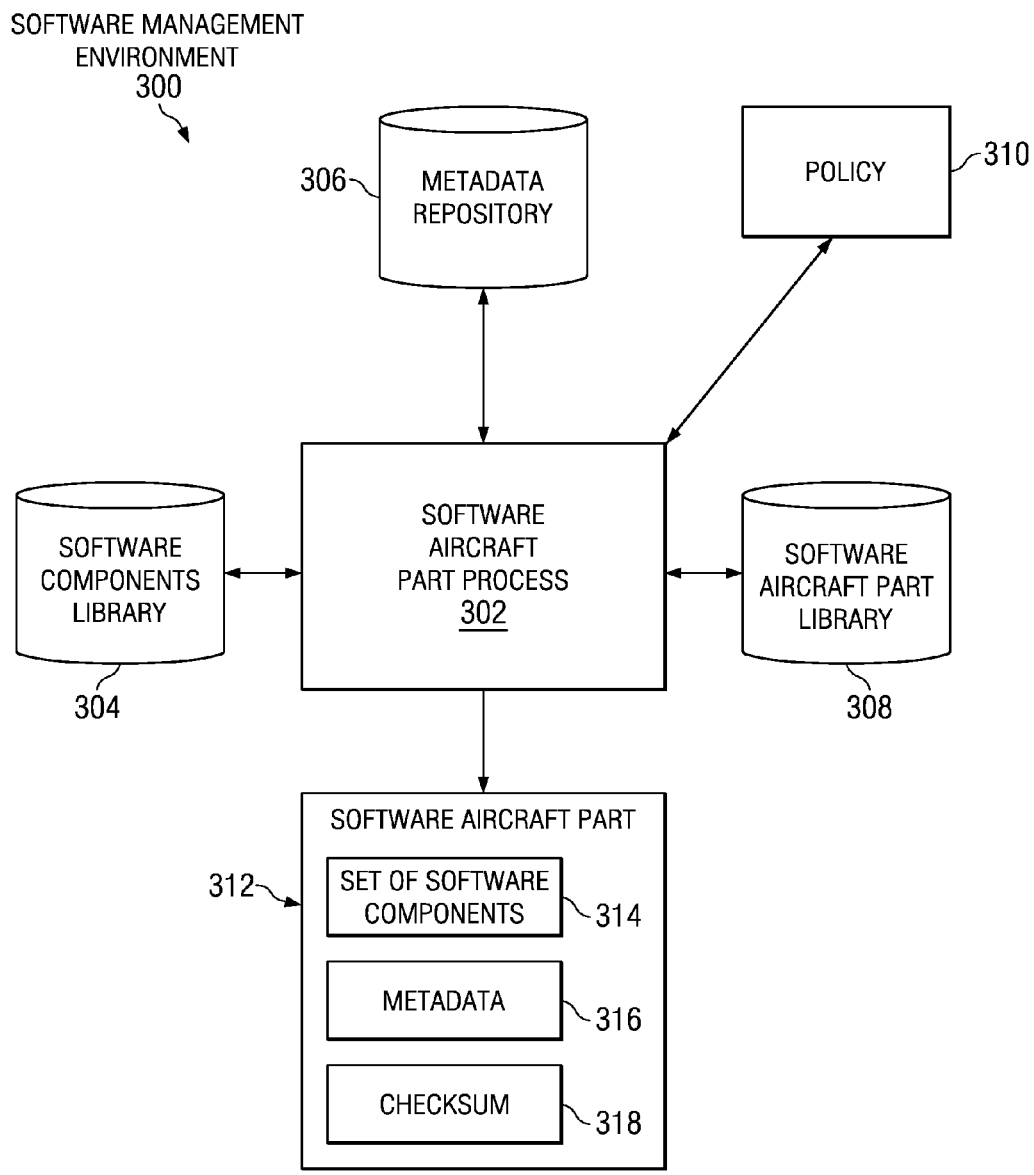
FIG. 3 is a diagram illustrating components used to create software aircraft parts in accordance with an advantageous embodiment.

Turning now to FIG. 3, a diagram illustrating components used to create software aircraft parts is depicted in accordance with an advantageous embodiment. In this example, software management environment 300 is an example of a software management environment that may be located at an entity, such as manufacturer 118 or airline 120 in FIG. 1. Additionally, software management environment 300 may be found at one or more locations for other types of entities involved with managing software aircraft parts for aircraft. For example, software management environment 300 also may be located at a maintenance facility for a maintenance organization. Software management environment 300 includes software aircraft part process 302, software components library 304, metadata repository 306, software aircraft part library 308, policy 310, and software aircraft part 312. Software aircraft part process 302 creates software aircraft parts, such as software aircraft part 312 in these examples.

Software aircraft part 312 contains a set of software components 314 and metadata 316. A set as used herein refers to one or more items. A set of software aircraft components 314 is one or more software components. As used herein, a software component may be any information in a computer usable form. In particular, this information is in a functional form that is usable by a computer, such as an aircraft data processing system.

A software component may be, for example, an executable file, a configuration file, a data file, or a text file. Metadata 316 describes a set of aircraft on which software aircraft part 312 may be used. In the different advantageous embodiments, software aircraft part 312 differs from other currently available software aircraft parts in that this part includes metadata 316.

Software aircraft part process 302 manages software aircraft parts, such as those found in software aircraft part library 308. The management of software aircraft parts may include, for example, creating software aircraft parts, organizing software aircraft parts, sending software aircraft parts for loading on to an aircraft data processing system, or any other suitable manipulation of software. Software aircraft part library 308 contains a set of software aircraft parts, such as software aircraft part 312. Software components library 304 contains software components that may be used to create and/or modify a software aircraft part, such as software aircraft part 312.

Metadata repository 306 contains information describing target aircraft on which a software aircraft part may be installed. Software aircraft part process 302 may be used to define metadata within metadata repository 306. This metadata defines the particular aircraft on which different software components within software components library 304 may be used.

In constructing a software aircraft part, a human operator of software aircraft part process 302 may select one or more target aircraft. The target aircraft may be based on the model and type of aircraft as well as a particular aircraft identified by a tail number. Based on the selection of the target aircraft, an operator selects a target aircraft for a particular part. Policy 310 determines what software components may be used from software components library 304 to create software aircraft part 312 for the target aircraft.

In some advantageous embodiments, some software components, tools, or features in the software components within software components library 304 may not be usable, depending on the selection of the target aircraft. Further, if the operator resets or selects a different type of target aircraft, software aircraft part process 302 uses policy 310 to determine whether the selected software components can still be used with the new target aircraft. If the components cannot be used with the new target aircraft, the session is reset. In other advantageous embodiments, certain features may be selectively disabled within the software components or certain software components may be removed from the software aircraft part being created instead of resetting the session.

After a set of software components have been selected from software components library 304 for software aircraft part 312, metadata 316 is added to software aircraft part 312 from metadata repository 306. The content of metadata 316 is selected based on the target aircraft selected by the operator of software aircraft part process 302. Metadata 316 is a software component that is part of software aircraft part 312.

Further, checksum 318 is generated based on a set of software components 314 and metadata 316. This checksum ensures that software aircraft part 312 has not been modified. The modification may occur, for example, from corruption or errors in a software component during transfer and/or loading of software aircraft part 312.

Once software aircraft part 312 is completed, software aircraft part 312 may be added to software aircraft part library 308. Further, software aircraft part 312 may be sent to an aircraft for use in a set of line replaceable units on the target aircraft.

Figure 4:
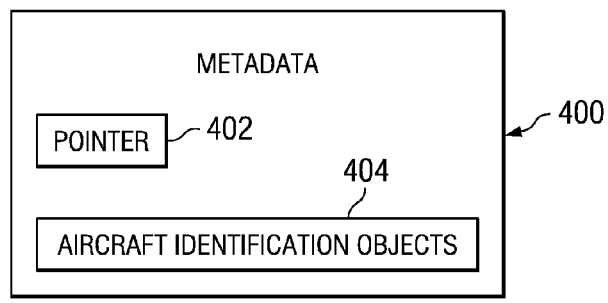
FIG. 4 is a diagram illustrating metadata in accordance with an advantageous embodiment.

With reference now to FIG. 4, a diagram illustrating metadata is depicted in accordance with an advantageous embodiment. In this example, metadata 400 is an example of metadata that may be found in a software aircraft part, such as software aircraft part 312 in FIG. 3. In this example, metadata 400 is an example of metadata 316 in FIG. 3. As illustrated, metadata 400 includes pointer 402 and aircraft identification objects 404. Pointer 402 is a pointer to a schema used to verify whether aircraft identification objects 404 are in the proper format for the schema. In these examples, aircraft identification objects 404 is a set of aircraft identification objects.

Each object within aircraft identification objects 404 provides a level of specificity about a set of aircraft on which a software aircraft part can be loaded. In these examples, each aircraft identification object within aircraft identification objects 404 has a different level of specificity or different type of information from other aircraft identification objects within metadata 400. Further, aircraft identification objects 404 are capable of being read from a computer readable media to verify whether the software aircraft part associated with metadata 400 can be loaded onto an aircraft.

In these examples, aircraft identification objects 404 may be in a markup language, such as an extensible markup language. The use of a markup language allows aircraft identification objects 404 to be read better by a computer or other data processing system and by a human reader once aircraft identification objects 404 have been extracted from the computer readable medium on which metadata 400 resides. In other words, a human operator may view aircraft identification objects 404 on a display of a data processing system and determine whether the aircraft on which the software aircraft part is to be loaded and use the software aircraft part associated with metadata 400.

This type of readability by a user in addition to its usability by a computer for verifying loadability of a software aircraft part is especially useful if information needed for the comparison with metadata 400 is unavailable for some reason. Then, the human operator may make those determinations based on reviewing aircraft identification objects 404 on a display.

Turning next to FIGS. 5a and 5b, a diagram illustrating a schema for metadata is depicted in accordance with an advantageous embodiment. In this example, schema 500 is an example of a schema that may be compared with metadata to determine whether the metadata is in the proper format for use in evaluating whether software can be loaded onto an aircraft. Schema 500 is an example of a schema that may be used in metadata 400 in FIG. 4.

The specificity with respect to what aircraft on which a software aircraft part can be loaded using schema 500 may vary depending on the particular implementation. For example, the specificity may be a model of an aircraft. Additionally, the model may be a Boeing 777 or a 747. The model also may have different specificity levels. For example, a major model and a minor model also may be used. A major model may be, for example, 777 or 747, while a minor model may be 777-200 or 777-300.

Further, the specificity also may include engine types. An engine may be different for the same model aircraft. For example, model 777-200 may have a Rolls-Royce engine or a General Electric engine. As a result, the software usable with these different types of engines may be different. A further example of specificity is a tail number. A tail number, in these examples, uniquely identifies an aircraft from other aircraft. As a result, different levels of specificity from a more specific range may be used to identify aircraft in which software aircraft parts are loadable for use.

In this example, schema 500 includes choices at different levels of specificity that may be used to identify aircraft on which a software aircraft part may be used. Section 501 provides a top level definition of a target. Next, section 502 in schema 500 provides an ability to identify a target aircraft based on a tail identifier or number in line 504; a type of airframe in line 506; or any aircraft in line 508. Thus, this section provides choices that allow a user to specify either a set of one or more tail identifiers, an airframe, or any aircraft.

Next, section 510 allows specification of the airframe type by a platform name that uses major model types as a restriction as to what aircraft can use a software aircraft part. Section 512 allows for another level of specificity for specifying aircraft by minor model types and an engine to be specified.

Turning now to FIG. 6, an example of a metadata file specifying a unique tail identifier for a target is depicted in accordance with an advantageous embodiment. Metadata file 600 is an example of metadata 400 in FIG. 4 using schema 500 in FIGS. 5a and 5b. In this example, metadata file 600 includes pointer 602, which is a universal resource locator for a schema, such as schema 500 in FIGS. 5a and 5b. In this example, a tail number is specified in line 604.

With reference now to FIG. 7, a diagram illustrating a metadata file specifying a target for any aircraft is depicted in accordance with an advantageous embodiment. Metadata file 700 is an example of metadata 400 in FIG. 4 using schema 500 in FIGS. 5a and 5b. Metadata file 700 includes a pointer to the schema in line 702. Line 704 indicates that any aircraft may be a target for the software aircraft part.

With reference now to FIG. 8, a diagram illustrating a metadata file specifying a set of major models is depicted in accordance with an advantageous embodiment. Metadata file 800 is another example of a metadata 400 in FIG. 4 using schema 500 in FIGS. 5a and 5b. In this example, metadata file 800 includes a pointer to the schema in line 802. Major models for the aircraft are defined in section 804.

Turning now to FIG. 9, a metadata file specifying a major model with a set of minor models is depicted in accordance with an advantageous embodiment. Metadata file 900 is yet another example of metadata 400 in FIG. 4 using schema 500 in FIGS. 5a and 5b. In this example, metadata file 900 includes a pointer to the schema in line 902. The major and minor models are defined in section 904. Line 906 defines the major model, while lines 908 and 910 define the minor model for the major model.

With reference now to FIG. 10, a metadata file specifying a major model and a minor model with an engine type is depicted in accordance with an advantageous embodiment. Metadata file 1000 is an example of metadata 400 in FIG. 4 using schema 500 in FIGS. 5a and 5b. In this example, metadata 1000 includes a pointer to the schema at line 1002. The major model is defined line 1004, while the minor model is defined in line 1006. The engine type restriction or selection is defined in line 1008.

Figure 11:
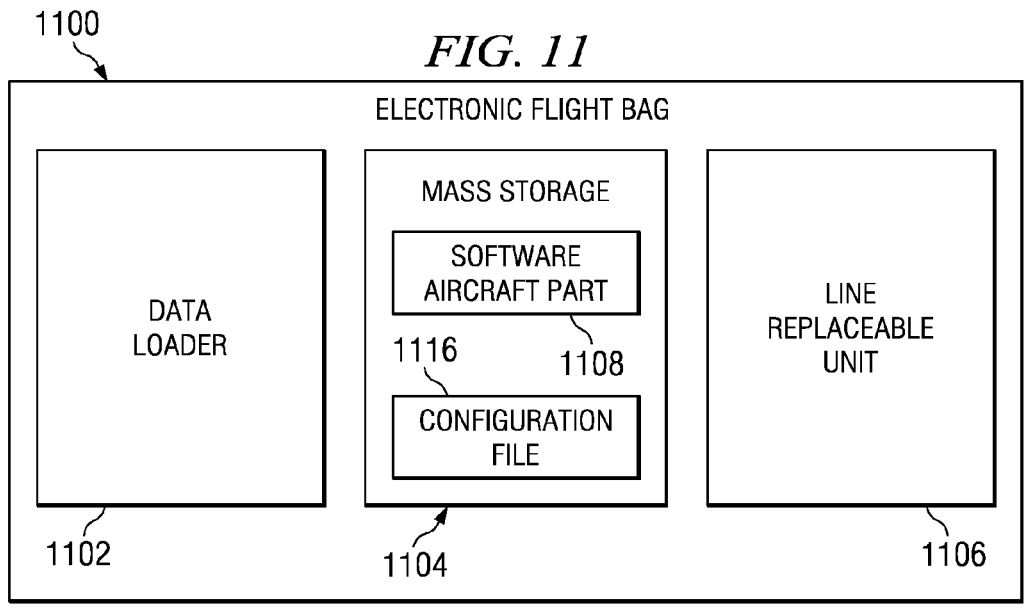
FIG. 11 is an example of an aircraft data processing system in accordance with an advantageous embodiment.

Turning now to FIG. 11, an example of an aircraft data processing system is depicted in accordance with an advantageous embodiment. In this example, electronic flight bag 1100 is an example an aircraft data processing system that may be found in an aircraft, such as aircraft 116 in FIG. 1. Electronic flight bag 1100 may be a portable device. In other advantageous embodiments, electronic flight bag 1100 may be integrated into the aircraft and connected to the aircraft network. In this example, electronic flight bag 1100 includes data loader 1102, mass storage 1104, and line replaceable unit 1106.

Data loader 1102 may be used to receive software aircraft parts that may be transferred to electronic flight bag 1100. When a software aircraft part, such as software aircraft part 1108, is received, data loader 1102 stores software aircraft part 1108 in mass storage 1104. Software aircraft part 1108 is a software aircraft part similar to software aircraft part 312 in FIG. 3. Mass storage 1104 may be, for example, any storage device, such as a hard disk drive and/or a solid state drive. Software aircraft part 1108 is not used or loaded into line replaceable unit 1106 until a determination is made as to whether software aircraft part 1108 is usable with line replaceable unit 1106.

Data loader 1102 is also used to load a software aircraft part, such as software aircraft part 1108, into line replaceable unit 1106 for use by line replaceable unit 1106.

A data loader is a device that is used to load software aircraft parts into an aircraft data processing system. More specifically, data loaders may be used to load a software aircraft part into a line replaceable unit. A data loader may be constructed based on a data loader standard from Aeronautical Radio, Incorporated (ARINC). In these examples, the standard is ARINC 615, which is a set of standards covering data loading and for transferring software and data to and from various avionic devices. A data level may be a functional component or a hardware device, depending on the particular implementation.

In these advantageous embodiments, data loader 1102 includes processes to ensure that software aircraft part 1108 is the correct or appropriate software aircraft part for use by line replaceable unit 1106.

The metadata within software aircraft part 1108 is checked by data loader 1102 against information about the aircraft. Data loader 1102 determines whether the metadata matches to the information located in configuration file 1116. This information about the aircraft may be obtained directly by interrogating other components within the aircraft.

If data loader 1102 determines that software aircraft part 1108 can be used in line replaceable unit 1106, data loader 1102 then loads software aircraft part 1108 into line replaceable unit 1106 for use. If software aircraft part 1108 is not suitable for use based on the comparison of the metadata to configuration information, then software aircraft part 1108 is not loaded into line replaceable unit 1106.

In these examples, the different components within electronic flight bag 1100 are illustrated as functional components. These components may be implemented in hardware and/or software, depending on the particular implementation. For example, data loader 1102 and line replaceable unit 1106 may be different electronic components within electronic flight bag 1100. In other advantageous embodiments, data loader 1102 and line replaceable unit 1106 may be software components or software parts executing within a single data processing system within electronic flight bag 1100. The components illustrated are depicted for purposes of illustrating different features of the advantageous embodiments. Other components may be present in addition to or in place of these in the electronic flight bag 1100. For example, electronic flight bag 1100 also may include a display, an output for a display device, user input controls, a communications unit to communicate with other data processing systems, and other suitable components.

Figure 12:
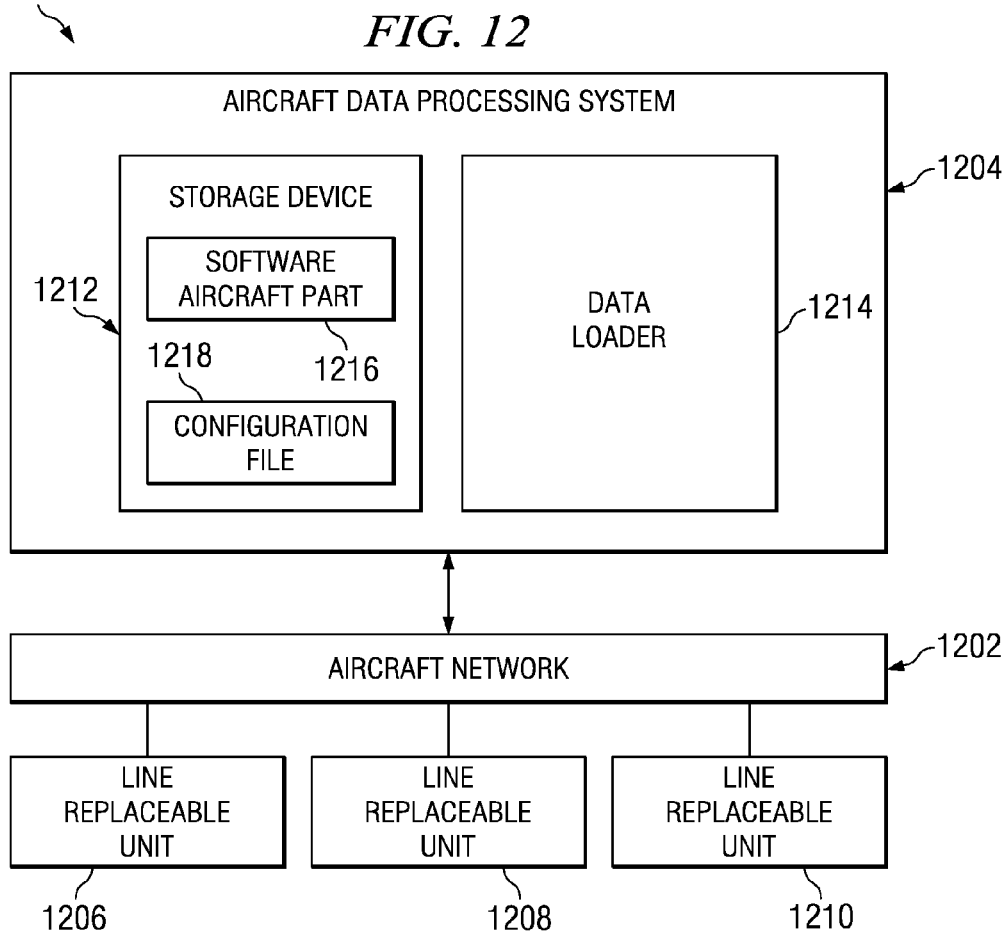
FIG. 12 is a diagram illustrating components in an avionics system used to load a software aircraft part in accordance with an advantageous embodiment.

Turning now to FIG. 12, a diagram illustrating components used to process the loading of a software aircraft part is depicted in accordance with an advantageous embodiment. In this example, avionics system 1200 is an example of an aircraft network that may be found within aircraft 116 in FIG. 1. Avionics system 1200 includes aircraft network 1202, aircraft data processing system 1204, line replaceable unit 1206, line replaceable unit 1208, and line replaceable unit 1210.

Avionics system 1200 is a network that provides communications between aircraft data processing system 1204 and a different line replaceable unit within avionics system 1200. In these examples, aircraft data processing system 1204 includes storage device 1212 and data loader 1214. Storage device 1212 stores software aircraft parts, such as software aircraft part 1216 and configuration file 1218. Storage device 1212 also may be referred to as a mass storage in some examples.

When a software aircraft part, such as software aircraft part 1216, is received by aircraft data processing system 1204, a part is stored within storage device 1212. In these examples, software aircraft part 1216 is not loaded into a line replaceable unit until an operator, such as a mechanic, initiates the loading of the software aircraft part. In response to such a request, data loader 1214 checks the metadata within software aircraft part 1216 to determine whether software aircraft part 1216 may be loaded into the selected line replaceable unit.

The determination of whether software aircraft part 1216 can be loaded into a line replaceable unit is made, in these examples, by comparing the metadata within software aircraft part 1216 to information about the aircraft. This information is stored in configuration file 1218. Of course, the information about the aircraft may also be obtained by interrogating various components within avionics system 1200.

For example, data loader 1214 may interrogate the line replaceable unit on which software aircraft part 1216 is to be loaded. If the comparison indicates that software aircraft part 1216 can be loaded, software aircraft part 1216 is loaded into the line replaceable unit by the data loader. Otherwise, software aircraft part 1216 remains unloaded in response to the request.

Avionics system 1200 may include other devices and software components, depending on the particular implementation. Only some of the components actually present in avionics system 1200 are depicted for purposes of illustrating features of the different advantageous embodiments. For example, avionics system 1200 also may include an electronic flight bag connected to aircraft network 1202. This electronic flight bag may be, for example, electronic flight bag 1100 in FIG. 11. Other examples of components that may be found in avionics system 1200 include, for example, wireless communication units, user input devices, displays, and other suitable components.

Figure 13:
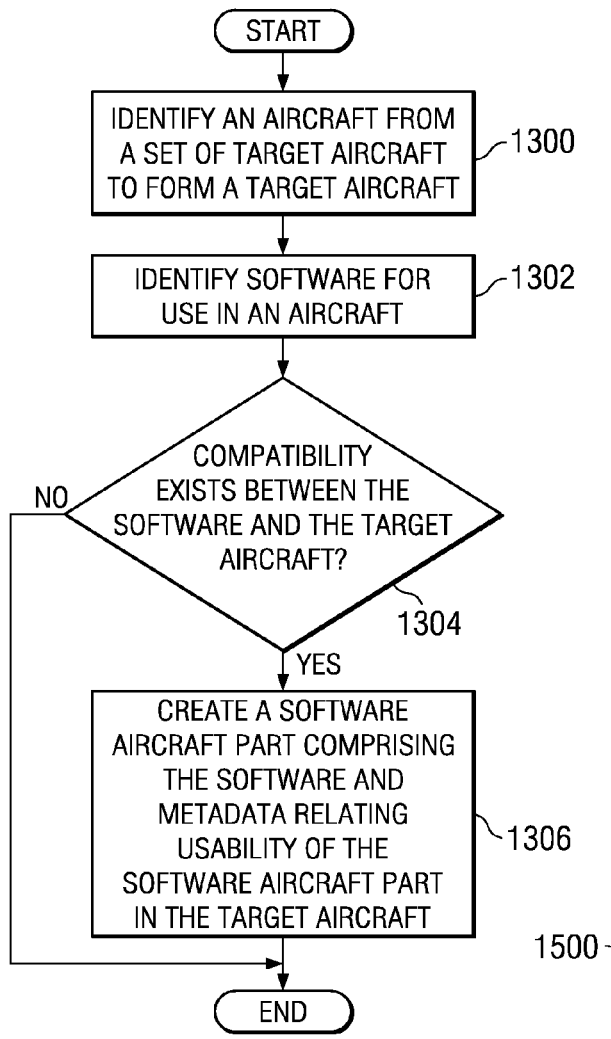
FIG. 13 is a high level flowchart of a process for creating a software aircraft part in accordance with an advantageous embodiment.

Turning now to FIG. 13, a high level flowchart of a process for creating a software aircraft part is depicted in accordance with an advantageous embodiment. The process illustrated in FIG. 13 may be implemented in an environment, such as software management environment 300 in FIG. 3. In particular, the different processes may be implemented within software aircraft part process 302 in FIG. 3.

The process begins by identifying an aircraft from a set of target aircraft to form a target aircraft (operation 1300). The selection of the set of target aircraft may take different forms. For example, the selection may be specific aircraft identified by tail numbers. In other embodiments, the selection may be a set of aircraft types. In yet other embodiments, the selection of the set of target aircraft may be a combination of specific aircraft and types of aircraft. This step selects an aircraft as the target for the software for aircraft part. Of course, more than one aircraft may be selected as the target aircraft, depending on the particular implementation. The process identifies software for use in an aircraft (operation 1302).

A determination is made as to whether compatibility exists between the identified software and the target aircraft (operation 1304). The determination in operation 1304 may be made using a policy, such as policy 310 in FIG. 3. The policy contains rules as to what software components may be used with particular aircraft. If compatibility exists, a software aircraft part is created containing the software and the metadata relating to usability of the software aircraft part in the target aircraft (operation 1306), with the process terminating thereafter. If compatibility does not exist, the process terminates without creating the software aircraft part.

Figure 14:
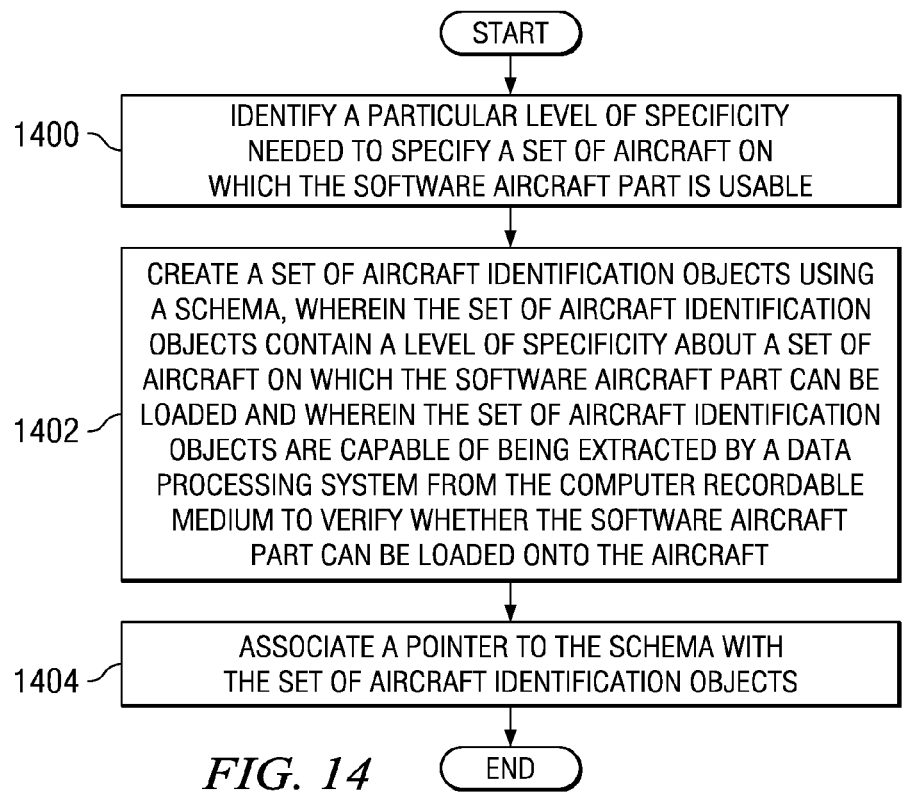
FIG. 14 is a flowchart of a process for creating metadata in accordance with an advantageous embodiment

With reference now to FIG. 14, a flowchart of a process for creating metadata is depicted in accordance with an advantageous embodiment. The process illustrated in FIG. 14 may be implemented in a software component, such as software aircraft part process 302 in FIG. 3.

The process begins by identifying a particular level of specificity needed to specify a set of aircraft on which a software aircraft part is usable (operation 1400). This identification may be made through user input selecting various aircraft or from design parameters received about the software aircraft part. The process then creates a set of aircraft identification objects using a schema (operation 1402).

In these examples, the set of aircraft identification objects forms metadata and contains a level of specificity about the set of aircraft on which the software aircraft part can be loaded and in which the set of aircraft identification objects are capable of being extracted by a data processing system from a computer readable medium to verify whether the software aircraft part can be loaded onto the aircraft.

Thereafter, the process associates a pointer to the schema with the set of aircraft identification objects (operation 1404), with the process terminating thereafter. The pointer points to a schema that made used to verify whether the set of aircraft identification objects is in the desired format.

Figure 15:
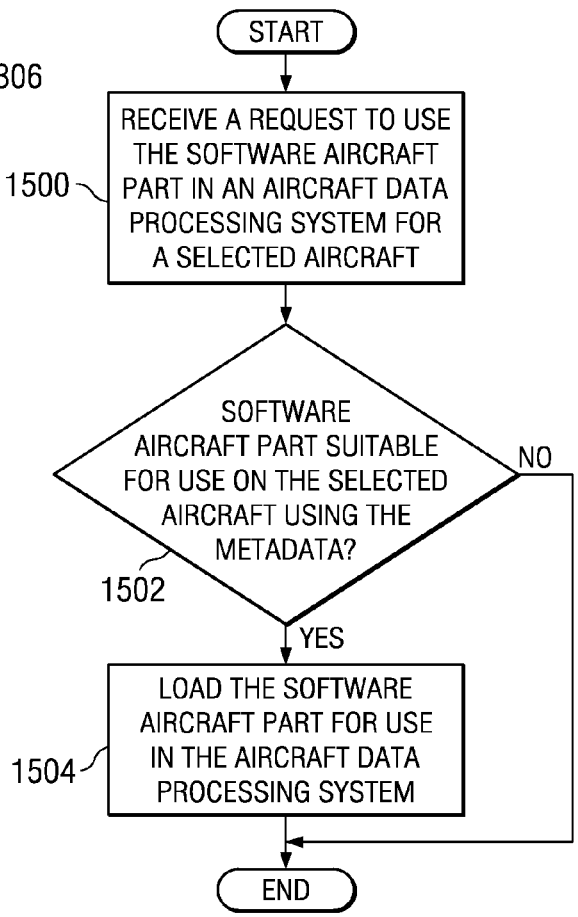
FIG. 15 is a high level flowchart of a process for loading a software aircraft part in accordance with an advantageous embodiment.

Turning now to FIG. 15, a high level flowchart of a process for loading a software aircraft part is depicted in accordance with an advantageous embodiment. The process illustrated in FIG. 15 may be implemented in an aircraft data processing system or avionics system on an aircraft. For example, the process illustrated in FIG. 15 may be implemented in electronic flight bag 1100 in FIG. 11 or avionics system 1200 in FIG. 12.

The process begins by receiving a request to use the software aircraft part in an aircraft data processing system for a selected aircraft (operation 1500). The request may take different forms, depending on the particular implementation. For example, if the software aircraft part is already located on a mass storage or storage device on the aircraft, the request may come from a human operator to load the software aircraft part into an aircraft data processing system, such as a line replaceable unit on the selected aircraft. In other advantageous embodiments, the request may take the form of a receipt of the software aircraft part in an avionics environment or an aircraft data processing system containing a line replaceable unit.

A determination is made as to whether the software aircraft part is suitable for use in the selected aircraft using the metadata in the software aircraft part (operation 1502). In operation 1502, the determination is made by comparing the metadata with information about the aircraft. This information may be, for example, an identification of configurations or components within the aircraft. These configurations or components may be, for example, a particular engine type, a type of line replaceable unit, an operating system located on a line replaceable unit, or a type of hydraulic system on the aircraft. The information may be obtained through various mechanisms. For example, a configuration file containing the information may be located on the aircraft. In other advantageous embodiments, various systems within the aircraft may be interrogated to obtain information.

If the software aircraft part is suitable for use, the software aircraft part is loaded for use in the aircraft data processing system (operation 1504), with the process terminating thereafter. In other examples, the software aircraft part may be loaded into a line replaceable unit in the aircraft data processing system. With this type of implementation, the line replaceable unit may be a software component, and/or a hardware device. Turning back to operation 1502, if the software aircraft part is not suitable for use on the selected aircraft, the process terminates.

This determination also may be performed during other management operations with respect to the software aircraft part. For example, a determination of the compatibility of the target aircraft and the software aircraft part may be made when an operator at an airline or manufacturer decides to send the software aircraft part to a particular aircraft. This determination also may be made during the transfer of the software aircraft part. For example, when the software aircraft part is transferred from a manufacturer to an airline, a check may be made as to whether the software aircraft part is suitable for the target aircraft.

Figure 16:
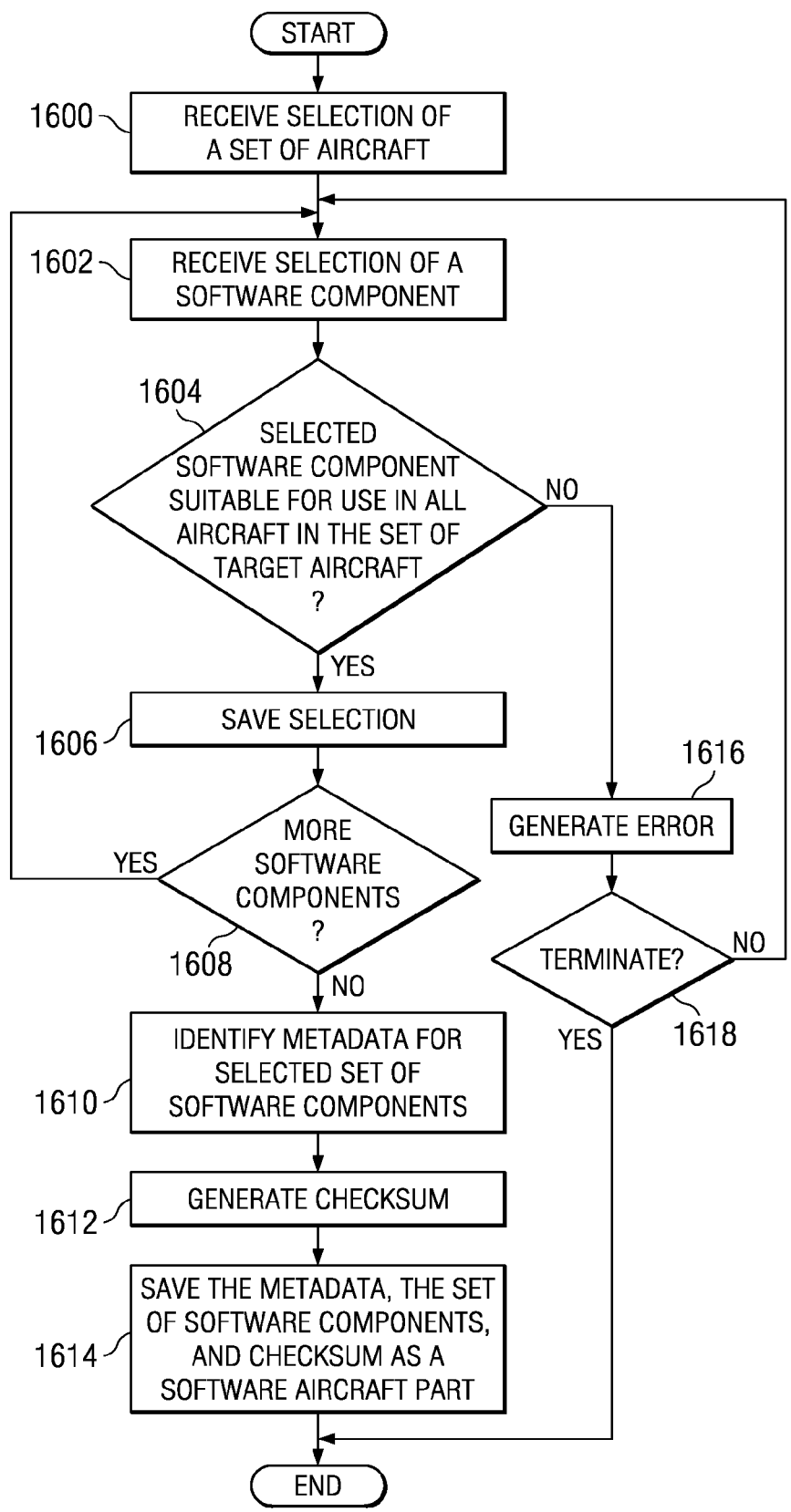
FIG. 16 is a flowchart of a process for creating a software aircraft part in accordance with an advantageous embodiment.

Turning now to FIG. 16, a flowchart of a process for creating a software aircraft part is depicted in accordance with an advantageous embodiment. The process illustrated in FIG. 16 may be implemented in a soft environment, such as software management environment 300 in FIG. 3. In particular, the process illustrated in FIG. 16 may be implemented in a software component, such as software aircraft part process 302 in FIG. 3.

The process begins by receiving a selection of a set of aircraft (operation 1600). The set of aircraft is a set of one or more aircraft for which the software aircraft part is to be used. The process then receives a selection of a software component (operation 1602). In these examples, the selection may be, for example, an executable file, a dynamic link library, a configuration file, an electronic manual, or some other data for use in the software aircraft part.

A determination is made as to whether the selected component is suitable for use in all of the aircraft in the set of target aircraft (operation 1604). If the component is suitable for use with all of the aircraft in the set of target aircraft, the process saves the selection of the software component (operation 1606). A determination is then made as to whether additional software components will be used in the software aircraft part (operation 1608). If additional software components will be used, the process returns to operation 1602.

Otherwise, an identification of metadata for the selected set of software components is made (operation 1610). This metadata provides an identification of the target aircraft on which the software components may be used. The process then generates a checksum (operation 1612). This checksum is a checksum for the metadata and the set of software components. The checksum may be used to ensure that a software aircraft part that has been altered or modified is not loaded into a line replaceable unit. Modifications also may occur through the transmission of the software aircraft part if errors in transmission occur.

The process then saves the metadata, the set of selected software components, and the checksum as a software aircraft part (operation 1614), with the process terminating thereafter. In these examples, the software aircraft part is saved in a library, such as software aircraft part library 308 in FIG. 3.

With reference again to operation 1604, if the selected software component is not suitable with all of the aircraft in the set of target aircraft, an error is generated (operation 1616). This error may indicate that one or more of the aircraft within the set of target aircraft cannot use the particular software component that has been selected. A determination is then made as to whether to terminate the process for generating the software aircraft part (operation 1618). If the process is not terminated, the process returns to operation 1602 to select another component. Otherwise, the process terminates.

In other advantageous embodiments, rather than requiring the user to select another software component, the error generated in operation 1616 may indicate that certain features in the software aircraft part may not be usable for the selected target aircraft and allow the user to continue with the same selected software component.

Figure 17:
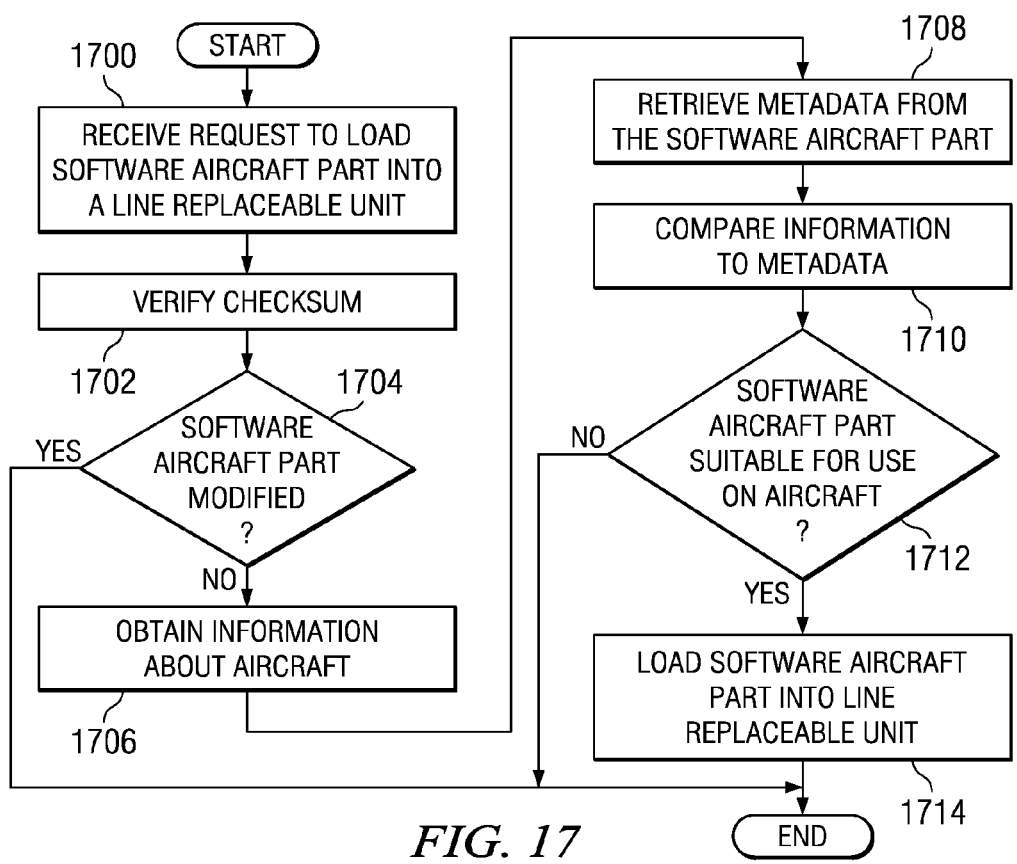
FIG. 17 is a flowchart of a process for loading a software aircraft part in accordance with an advantageous embodiment.

Turning now to FIG. 17, a flowchart of a process for loading a software aircraft part is depicted in accordance with an advantageous embodiment. The process illustrated in FIG. 17 may be implemented using a component, such as electronic flight bag 1100 in FIG. 11 or avionics system 1200 in FIG. 12. In particular, these processes may be implemented in a data loader, such as data loader 1102 in FIG. 11 or data loader 1214 in FIG. 12.

The process illustrated in FIG. 17 is performed when a request is made to load the software aircraft part into the line replaceable unit. This check could be made at other times, but making the check at this point ensures that a modification to the software aircraft part has not occurred just before the part is loaded into the line replaceable unit.

The process begins by receiving a request to load a software aircraft part into a line replaceable unit (operation 1700). In these examples, the request is made by a human operator, such as a maintenance technician. In other advantageous embodiments, this request may be received electronically. The process then verifies a checksum for the selected aircraft part in the storage device (operation 1702).

Thereafter, a determination is made as to whether the software aircraft part has been modified (operation 1704). The software aircraft part has not been modified for use if the checksum has been verified. If the software aircraft part has not been modified, the process obtains information about the aircraft (operation 1706). This information may be obtained from a configuration file stored in the storage device on the aircraft or by interrogating components within the aircraft. Next, metadata is retrieved from the software aircraft part (operation 1708). The information about the aircraft is compared to the metadata from the software aircraft part (operation 1710).

A determination is made as to whether the software aircraft part is suitable for use on the aircraft from the comparison (operation 1712). If the software aircraft part is suitable for use, the software aircraft part is loaded into the line replaceable unit (operation 1714), with the process terminating thereafter.

With reference again to operation 1712, if the software aircraft part is not suitable for use in the aircraft, the process terminates. The process also terminates in operation 1704 if the software aircraft part has been modified from the checksum verification performed in operation 1702.

Thus, the different advantageous embodiments provide a computer implemented method, apparatus, and computer usable program code for managing software aircraft parts. This management of software aircraft parts may include the creation of software aircraft parts in a manner that the software aircraft parts may be checked for suitability for use on a particular aircraft during a loading process. The different advantageous embodiments also provide a feature in which a check may be made of a software aircraft part before that part is actually used in an aircraft data processing system.

In this manner, a tedious process of checking the parts prior to sending the parts to an aircraft may be avoided. Also, the different advantageous embodiments allow for checks to be made when the software aircraft part is actually loaded. These types of features are currently unavailable with the current systems for loading software aircraft parts into an aircraft.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A data structure residing on a tangible computer recordable medium for verifying whether a software aircraft part can be loaded, the data structure comprising:
    a set of aircraft identification objects, wherein an aircraft identification object within the set of aircraft identification objects contains a level of specificity about a set of aircraft on which the software aircraft part can be loaded and wherein the set of aircraft identification objects are read by an aircraft data processing system of an avionics system within an aircraft from the tangible computer recordable medium to verify whether the software aircraft part can be loaded in the aircraft, and
    a metadata file, wherein the set of aircraft identification objects are stored on the metadata file, and wherein the set of aircraft identification objects includes information regarding at least one of aircraft major model, aircraft minor model, aircraft engine type, and aircraft tail number, wherein the metadata file is compared to information about the aircraft stored within the aircraft data processing system of the avionics system within the aircraft, and wherein the software aircraft part is loaded in the avionics system within the aircraft responsive to the comparison indicating that the software aircraft part can be loaded.

2. The data structure of claim 1, wherein the set of aircraft identification objects are described using program code that is capable of being read by both a computer and a human when extracted from the computer recordable medium.

3. The data structure of claim 2, wherein the program code describing the set of aircraft identification objects take the form of an extensible markup language.

4. The data structure of claim 1, wherein the data structure is a metadata file.

5. The data structure of claim 1, wherein each aircraft identification object within the set of aircraft identification objects has a different level of specificity from another aircraft identification object within the set of aircraft identification objects.

6. The data structure of claim 1, wherein the set of aircraft identification objects described using program code are described using a schema and further comprising:
    a pointer to a location of the schema.

7. The data structure of claim 1, wherein the software aircraft part is checked for suitability for use on a particular aircraft during a loading process, wherein the software aircraft part is loaded into a line replaceable unit if the software aircraft part is suitable for use.

8. The data structure of claim 1, wherein the set of aircraft identification objects are written in an extensible markup language.

9. A computer implemented method for identifying usability of a software aircraft part in an aircraft, the computer implemented method comprising:
    identifying a particular level of specificity needed to specify a set of aircraft on which the software aircraft part is usable;
    creating a set of aircraft identification objects, wherein the set of aircraft identification objects contains a level of specificity about the set of aircraft on which the software aircraft part can be loaded, and wherein the set of aircraft identification objects includes information regarding at least one of aircraft major model, aircraft minor model, aircraft engine type, and aircraft tail number;

storing the set of aircraft identification objects on a metadata file;

extracting the set of aircraft identification objects by a data processing system from a computer recordable medium;

reading the set of aircraft identification objects by the aircraft data processing system of an avionics system within the aircraft;

comparing the set of aircraft identification objects to information about the aircraft stored in the aircraft data processing system located on the aircraft;

verifying whether the software aircraft part can be loaded onto the aircraft; and loading the software aircraft part.

10. The computer implemented method of claim 9 further comprising:

determining whether to load the software aircraft part on the aircraft using the set of aircraft identification objects.

11. The computer implemented method of claim 9, wherein the creating step comprises:

creating the set of aircraft identification objects using a schema, wherein the set of aircraft identification objects contains the level of specificity about the set of aircraft on which the software aircraft part can be loaded and wherein the set of aircraft identification objects are capable of being extracted by the data processing system from the computer recordable medium to verify whether the software aircraft part can be loaded onto the aircraft; and associating a pointer to the schema with the set of aircraft identification objects.

12. The computer implemented method of claim 9, wherein the software aircraft part is checked for suitability for use on a particular aircraft during a loading process, wherein the software aircraft part is loaded into a line replaceable unit if the software aircraft part is suitable for use.

13. The computer implemented method of claim 9, wherein the set of aircraft identification objects are viewable by a human user on a display of the data processing system when the set of aircraft identification objects are extracted from the computer recordable medium.

14. A computer program product for verifying whether a software aircraft part can be loaded, the computer program product comprising:

a tangible computer recordable medium;

program code, stored on the tangible computer recordable medium, for identifying a particular level of specificity needed to specify a set of aircraft on which the software aircraft part is usable;

program code, stored on the tangible computer recordable medium, for creating a set of aircraft identification objects, wherein the set of aircraft identification objects contains a level of specificity about the set of aircraft on which the software aircraft part can be loaded, and wherein the set of aircraft identification objects includes information regarding at least one of aircraft major model, aircraft minor model, aircraft engine, and aircraft tail number;

storing the set of aircraft identification objects on a metadata file;

program code, stored on the tangible computer recordable medium, for extracting the set of aircraft identification objects by a data processing system from a computer recordable medium;

program code, stored on the tangible computer recordable medium, for reading the set of aircraft identification objects by the aircraft data processing system of an avionics system within the aircraft;

program code, stored on the tangible computer recordable medium, for comparing the set of aircraft identification objects to information about the aircraft stored in the aircraft data processing system located on the aircraft;

program code, stored on the tangible computer recordable medium, for verifying whether the software aircraft part can be loaded onto the aircraft; and program code, stored on the tangible computer recordable medium, for loading the software aircraft part.

15. The computer program product of claim 14 further comprising:

program code, stored on the computer recordable medium, for determining whether to load the software aircraft part on the aircraft using the set of aircraft identification objects.

16. The computer program product of claim 14, wherein the program code, stored on the computer recordable medium, for creating the set of aircraft identification objects comprises:

program code, stored on the computer recordable medium, for creating the set of aircraft identification objects using a schema, wherein the set of aircraft identification objects contains the level of specificity about the set of aircraft on which the software aircraft part can be loaded and wherein the set of aircraft identification objects are capable of being extracted by the data processing system from the computer recordable medium to verify whether the software aircraft part can be loaded onto the aircraft; and program code, stored on the computer recordable medium, for associating a pointer to the schema with the set of aircraft identification objects.

17. The computer program product of claim 14, wherein the set of aircraft identification objects are viewable by a human user on a display of the data processing system when the set of aircraft identification objects are extracted from the computer recordable medium.

* * * * *